United States Patent
Shawver

(10) Patent No.: US 10,837,567 B1
(45) Date of Patent: Nov. 17, 2020

(54) SELECTABLE ON/OFF SEQUENCING VALVE

(71) Applicant: Michael Shawver, Mill Valley, CA (US)

(72) Inventor: Michael Shawver, Mill Valley, CA (US)

( * ) Notice: Subject to any disclaimer, the term of this patent is extended or adjusted under 35 U.S.C. 154(b) by 92 days.

(21) Appl. No.: 16/393,331

(22) Filed: Apr. 24, 2019

(51) Int. Cl.
| | |
|---|---|
| *F17D 3/00* | (2006.01) |
| *F16K 17/04* | (2006.01) |
| *F16K 41/10* | (2006.01) |
| *A01G 25/16* | (2006.01) |
| *F16K 7/16* | (2006.01) |

(52) U.S. Cl.
CPC .......... *F16K 17/048* (2013.01); *A01G 25/162* (2013.01); *F16K 7/16* (2013.01); *F16K 41/103* (2013.01); *Y10T 137/86437* (2015.04)

(58) Field of Classification Search
CPC ..... Y10T 137/86389; Y10T 137/86413; Y10T 137/86421; Y10T 137/86437
See application file for complete search history.

(56) References Cited

U.S. PATENT DOCUMENTS

| | | | |
|---|---|---|---|
| 1,606,245 A | 11/1926 | Lang | |
| 2,380,969 A * | 8/1945 | King | ..................... E21B 43/122 137/624.16 |
| 2,478,702 A | 8/1949 | Moody | |
| 3,347,785 A * | 10/1967 | Staats | ..................... B01J 49/75 210/672 |
| 3,431,633 A | 3/1969 | Fulks | |
| 3,705,278 A * | 12/1972 | Scott | ....................... D06F 33/10 200/33 B |
| 4,125,124 A | 11/1978 | Kah | |
| 4,407,451 A * | 10/1983 | Hunter | ................. A01G 25/162 239/66 |
| 4,522,221 A * | 6/1985 | Chivens | ................ G01F 13/006 137/118.07 |
| 4,526,198 A | 7/1985 | Scott | |
| 4,796,657 A | 1/1989 | Baker | |
| 4,807,664 A * | 2/1989 | Wilson | ................. A01G 25/165 137/624.11 |
| 4,921,002 A | 5/1990 | Christon et al. | |
| 5,944,052 A | 8/1999 | Rashidi | |
| 6,755,204 B2 | 6/2004 | Herbert et al. | |
| 7,044,403 B2 | 5/2006 | Kah, III | |
| 9,341,281 B2 * | 5/2016 | Hurst | ....................... G05D 7/03 |

(Continued)

*Primary Examiner* — Robert K Arundale
(74) *Attorney, Agent, or Firm* — Steven A. Nieslen; www.NielsenPatents.com

(57) ABSTRACT

A disclosed system may add different irrigation timing intervals than those of a master flow irrigation system. Electronic timing systems are not used. Native water pressure flowing internally into the system to move components and otherwise control flow ports is used to control timing. A main fluid intake may accept fluid to pressurize and motivate a diaphragm. The diaphragm houses a ratchet flexure finger which may tangentially engage and rotate a gear spindle which is rotationally coupled to and houses one or multiple cams. A 2-way valve is in contact with one of the cams tangentially and centrically via a valve plunger. The cam(s) have lobe(s) with the peak of the profile being the nose and lower profile base circles. As the cam is rotated, it engages with the valve plunger at the nose or base circle, thus opening and closing the 2-way valve and allowing or stopping flow.

8 Claims, 12 Drawing Sheets

(56) References Cited

U.S. PATENT DOCUMENTS

| | | |
|---|---|---|
| 9,599,286 B2 | 3/2017 | Hurst |
| 9,939,071 B2 | 4/2018 | Lin et al. |
| 2006/0032536 A1 | 2/2006 | Galloway |
| 2010/0276011 A1 | 11/2010 | Spitzer |
| 2011/0259427 A1* | 10/2011 | Slafter .................. F16K 31/523 |
| | | 137/1 |

* cited by examiner

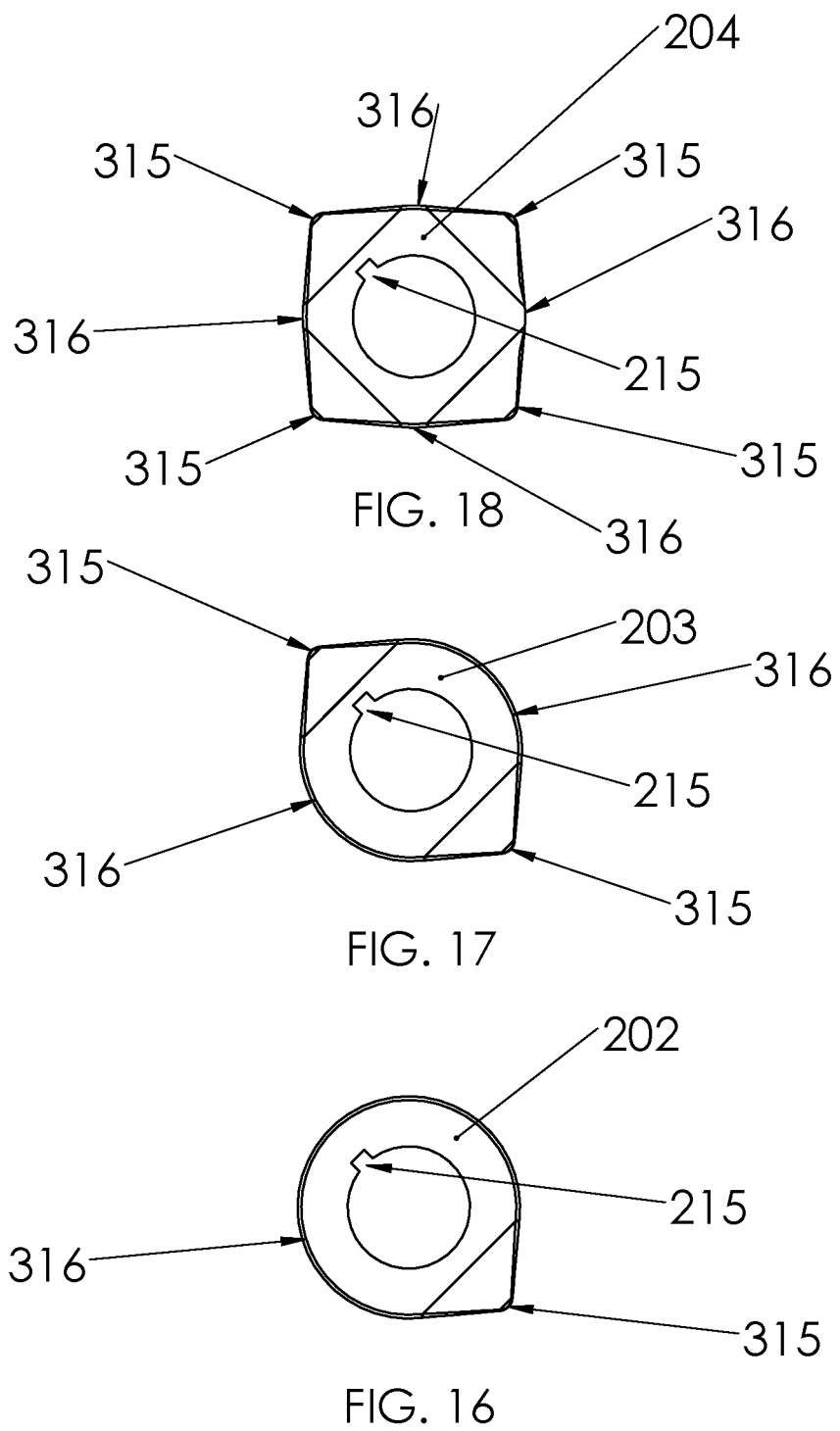

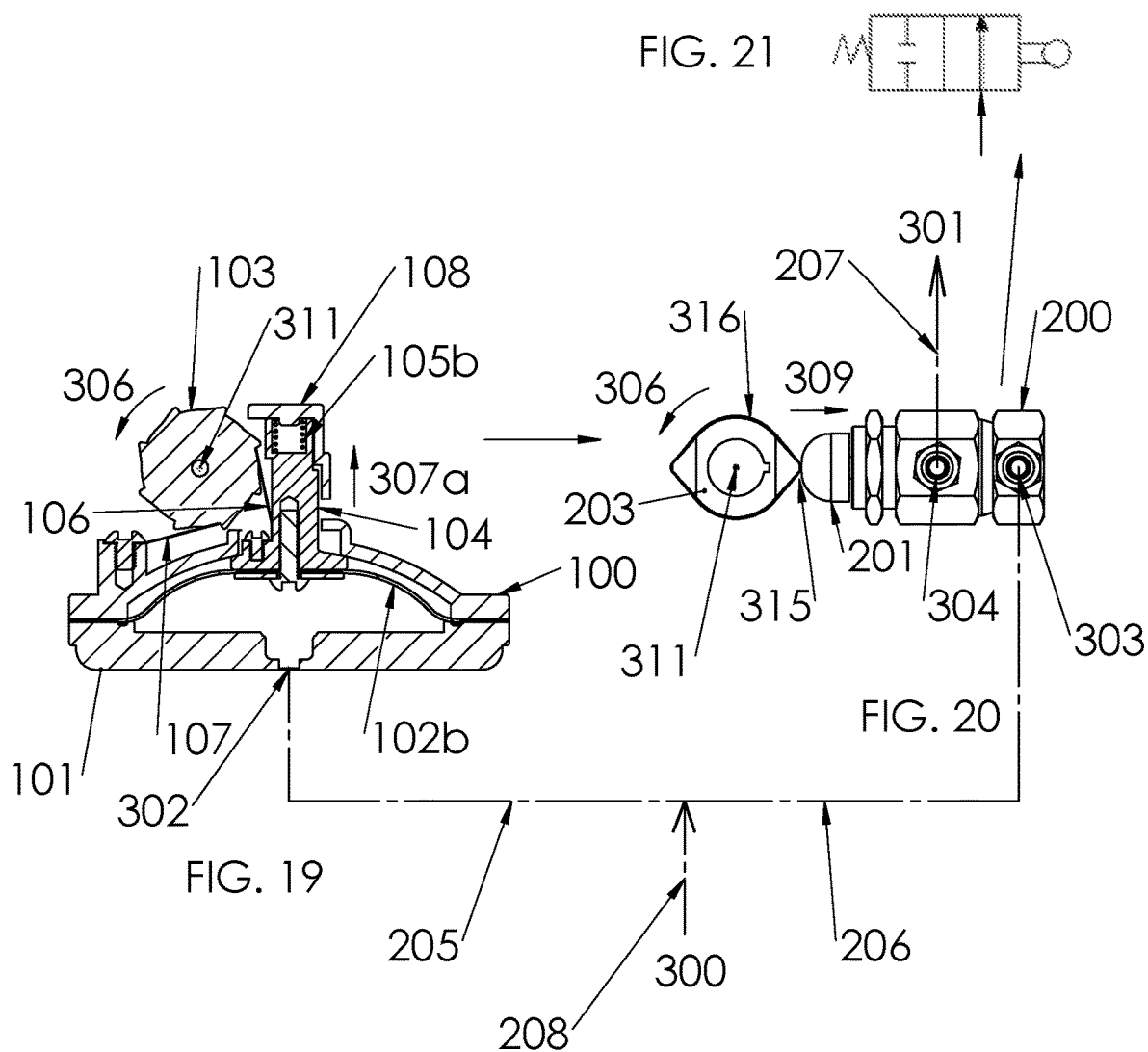

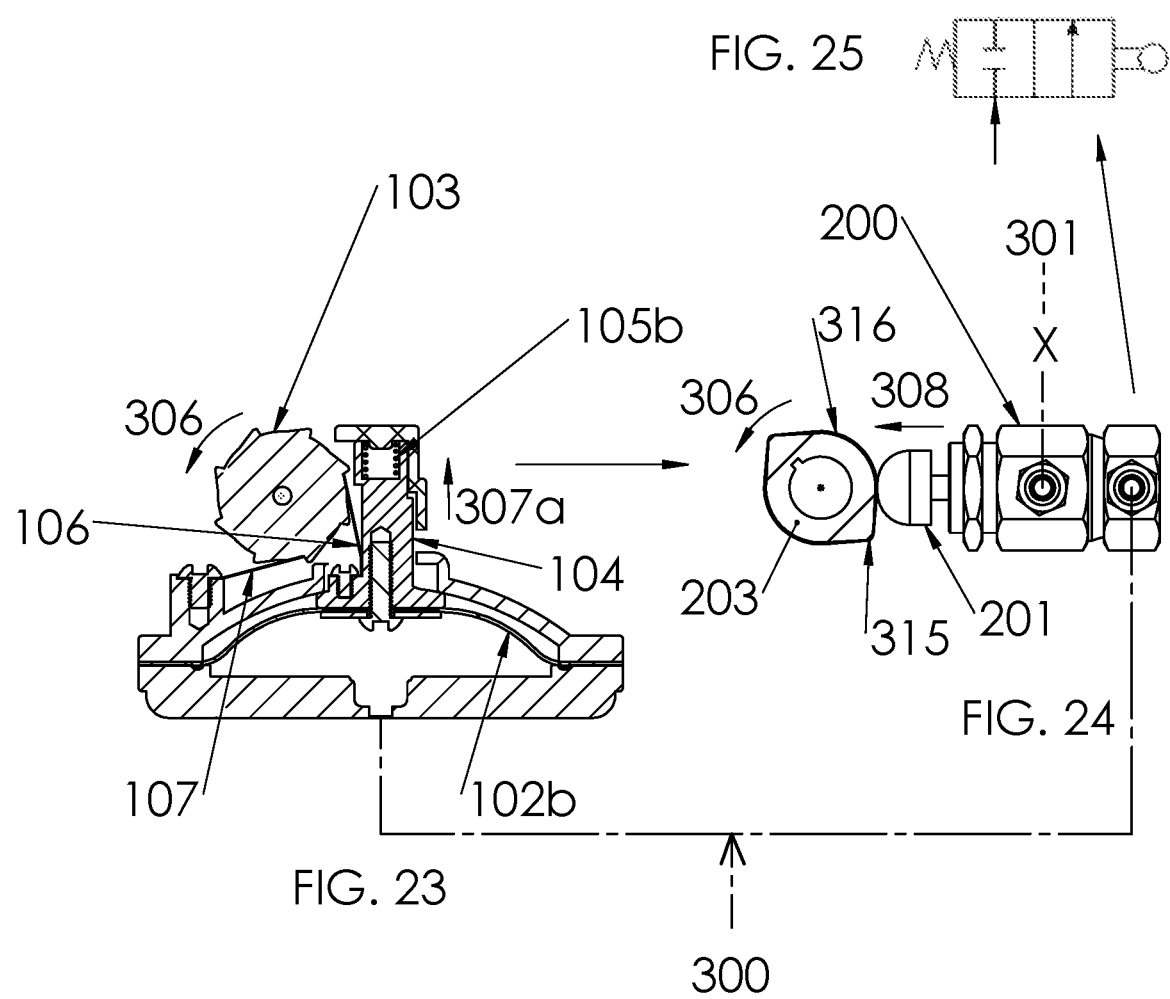

SELECTABLE ON/OFF SEQUENCING VALVE

RELATED PATENT APPLICATION AND INCORPORATION BY REFERENCE

NA

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to valve control systems used to turn fluid flow on and off in flow circuits. More particularly, the invention relates valve control systems which are set to open and close at set timing intervals and the ability to individually modify and micro-control discrete sections of the flow circuit.

(2) Description of the Related Art

Other electronically controlled on/off valve products which may incorporate batteries, external AC or DC voltage and associated printed circuit boards and electronic motivation components are known. Mechanically indexing distribution valves without selectable sequencing features are also known.

U.S. Pat. No. 6,755,204 by Herbert et al. uses an electronic solenoid valve and other electronics, see FIG. 16 to control an indexing mechanism within a system having two different output ports.

U.S. Pat. No. 5,944,052 by Rashidi uses electronic means of valve control.

U.S. Pat. No. 4,921,002 by Christon et al discloses an automatic watering zone switcher or other means of using water pressure to control various values. But, the Christon design is unduly complex and difficult to manufacture. Moreover, the Christon system switches from one outlet to another, and is not an on and off system as found herein within the disclosed embodiments.

U.S. published patent application 20060032536 by Galloway et al discloses a valve monitor and distribution valve system using non-contact electric sensors.

U.S. published patent application 20100276011 by Spritzer discloses an annular flow path with centrally disposed valve members.

U.S. Pat. No. 9,341,281 by Baechle discloses an automotive brake system using recirculation principles.

The known prior art fails to disclose suggest or anticipate a diaphragm actuated, fully self-contained system of on and off sequencing valves with selectable cam sequencing that is devoid of electrical means, thus, there is a need in the art for the disclosed embodiments. The known prior art has no similar on/off sequencing valves within a diaphragm actuated and fully self-contained system having selectable cam sequencing that is devoid of electrical input or electrical circuitry.

BRIEF SUMMARY OF THE INVENTION

The invention provides the ability to modify a main pressurized flow system network (fluids include liquid, air, other gases) set on a scheduled on/off timing system. The timed flow system may be set with an electronically controlled and activated master on/off valve to feed a pressurized medium to multiple flow outputs via a main system artery. In irrigation and related applications, the need arises to control various parts of a system with different timing intervals than those controlled by the master flow system timing. Typical solutions to this problem usually involve adding additional electronic master on/off valve systems. The current invention eliminates the need to add addition master control valves. Disclosed embodiments may be mechanically activated by the main fluid flow intake. Disclosed embodiments may be free standing and require no additional plumbing or electrical connections to operate.

The presently disclosed embodiments may allow for one or more of the individual flow output branches on the main timing scheduled system to be incrementally skipped, or have flow cut off, during the normal main valve open condition. Disclosed embodiments can further provide features that allow for the selecting of various incremental skipping steps of the main valve timed on/off scheduling at the individual, or groups of, flow output locations.

The disclosed embodiments may be comprised of a main fluid intake that pressurizes and motivates and/or influences and/or moves a diaphragm and guide axially. The guide houses a ratchet flexure finger which tangentially engages and rotates a gear spindle which is rotationally coupled to and houses one or multiple cams. A two-way valve is in contact with one of the cams tangentially and centrically via a valve plunger. The cam or cams have one or more lobes with the peak of the profile being the nose and one or more lower profile base circles. As the cam is rotated, it engages with the valve plunger at the nose or base circle, thusly translating the plunger axially and opening or closing the valve flow. Multiple cams with different numbers of lobes, four, two and one for example, may be slidably mounted on a gear spindle and nested in a sliding yoke. The sliding yoke may be manually moved to position each of the different cams at the centerline of the valve plunger to increment various open close cycles of the valve.

The main fluid intake also provides fluid pressure at the valve intake port via a branched circuit or T fitting. Fluid pressure at the valve intake is always present when the main fluid line is pressurized. Fluid is only allowed to flow into the valve and exit from the valve outlet port when the nose of the cam is at its peak position and has depressed the valve plunger and opened the valve.

The disclosed embodiments may be particularly useful for modifying the timing of watering individual plants, or groups of plants connected to a time set drip irrigation circuit used in residential and agricultural systems. Disclosed embodiments may also be scaled up in size and may be useful in industrial fluid handling systems.

The known related art fails to disclose, suggest or teach the use of the disclosed embodiments, systems and methods as discussed above.

BRIEF DESCRIPTION OF THE DRAWINGS

FIG. 16 depicts a side view of a cam with 1 lobe.

FIG. 17 depicts a side view of a cam with 2 lobes.

FIG. 18 depicts a side view of a cam with 4 lobes.

FIG. 19 depicts a partial cross sectional view of diaphragm housing, diaphragm housing cap, diaphragm guide, gear spindle, compression spring, spring mount, ratchet flexure finger and ratchet flexure pawl.

FIG. 20 depicts a side view of a valve, valve plunger and cam and sectional view of a diaphragm housing.

FIG. 21 depicts a graphic symbol of a normally closed 2-way valve in the open position

FIG. 23 depicts a partial cross sectional view of diaphragm housing, diaphragm housing cap, diaphragm guide, gear spindle, compression spring, spring mount, ratchet flexure finger and ratchet flexure pawl.

FIG. 24 depicts a side view of a valve, valve plunger and cam

FIG. 25 depicts a graphic symbol of a normally closed 2-way valve in the closed position

Figure 1:
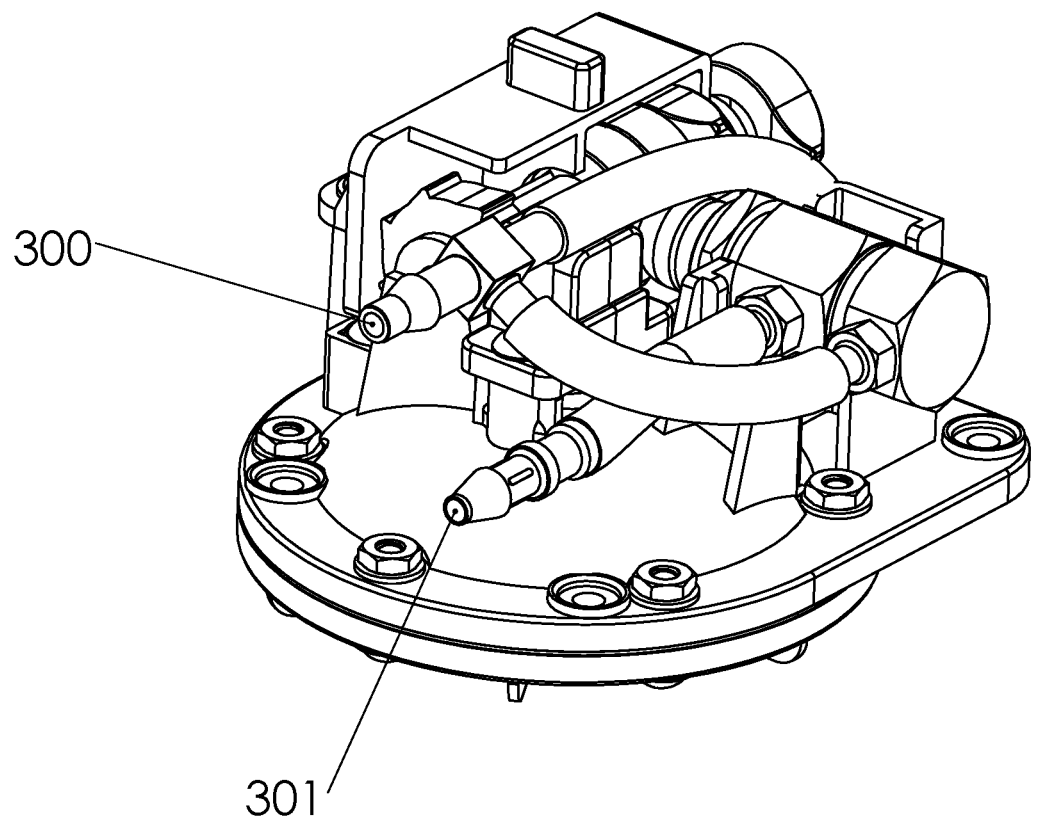
FIG. 1 depicts a top perspective view of one embodiment of the invention.

REFERENCE NUMERALS IN THE DRAWINGS 100 diaphragm housing
101 diaphragm housing cap
102a diaphragm in a neutral flat configuration
102b diaphragm in a pressurized flexed configuration
103 gear spindle
104 diaphragm guide rod
105 elastic member such as a compression spring
105a compression spring in an uncompressed configuration
105b compression spring in a compressed configuration
106 ratchet flexure finger
107 ratchet flexure pawl
108 spring mount
109 slider yoke
200 2-way normally closed valve
201 valve plunger
202 cam a
203 cam b
204 cam c
205 diaphragm housing cap inlet tube
206 valve inlet tube
207 outlet tube
208 tee fitting
209 slider yoke finger push tab
210 gear spindle front pivot
211 gear spindle rear pivot
212 front pivot mount
213 rear pivot mount
214 gear spindle keying rib
215 cam key groove
216 guide posts
217 slider yoke guide slots
300 fluid input feed
301 fluid output
302 diaphragm housing cap inlet
303 valve inlet
304 valve outlet
305 bilateral movement direction arrows of slider yoke 109
306 rotation direction arrow of gear spindle 103 and lobed cams 202, 203, 204
307a upward movement direction arrow of guide rod 104
307b downward movement direction arrows of guide rod 104
308 movement direction arrow of valve plunger 201 to valve 200 closed position
309 movement direction arrow of valve plunger 201 to valve 200 open position
310 directional arrow of fluid flow
311 center of the common axis of rotation of gear spindle 103 and lobed cams 202, 203, 204
312 movement direction arrow depicting slider yoke finger push tab being pushed downward relative to page to the bottom position
313 movement direction arrow depicting slider yoke finger push tab being pushed upwards relative to page to the middle position 314 movement direction arrow depicting slider yoke finger push tab being pushed upwards relative to page to the top position 315 lobe nose or peak of cam 202, 203, 204 profiles 316 base circle of cam 202, 203, 204 profiles These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a mechanically actuated, selectable on/off sequencing valve with fluid input feed 300 and fluid output 301 port is depicted in perspective view.

Figure 2:
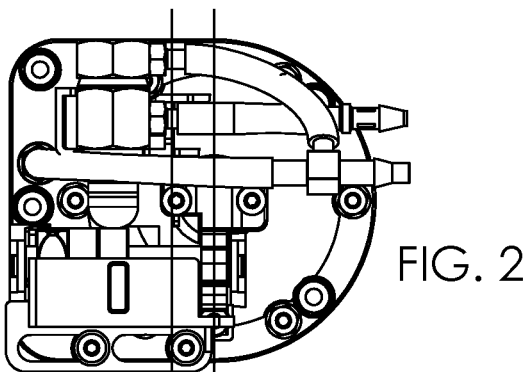
FIG. 2 depicts a top view of one embodiment of the invention.

FIG. 2, depicts a top view a mechanically actuated, selectable on/off sequencing valve with cross section lines for views depicted in FIGS. 20, 23 and FIGS. 19, 21, 22.

Figure 3:
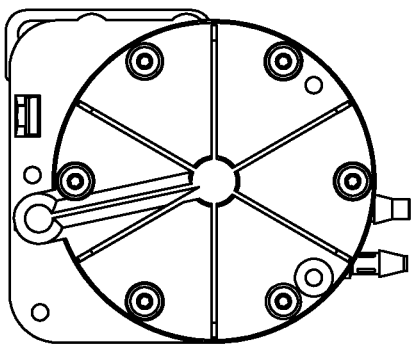
FIG. 3 depicts a bottom view of one embodiment of the invention.

FIG. 3 depicts a bottom view of a mechanically actuated, selectable on/off sequencing valve.

Figure 4:
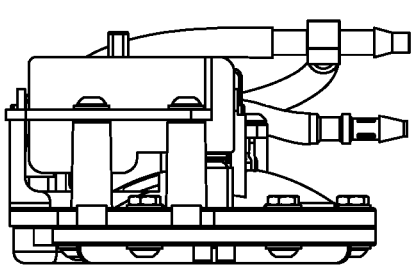
FIG. 4 depicts a right side view of one embodiment of the invention.

FIG. 4 depicts a right side view of one embodiment of a mechanically actuated, selectable on/off sequencing valve.

Figure 5:
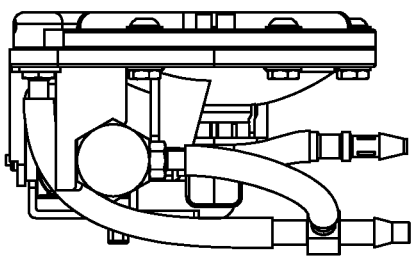
FIG. 5 depicts a left side view of one embodiment of the invention.

FIG. 5 depicts a left side view of a mechanically actuated, selectable on/off sequencing valve.

Figure 6:
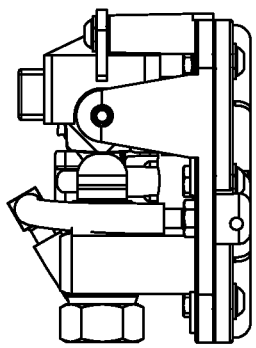
FIG. 6 depicts a rear view of one embodiment of the invention.

FIG. 6 depicts a rear view of a mechanically actuated, selectable on/off sequencing valve.

Figure 7:
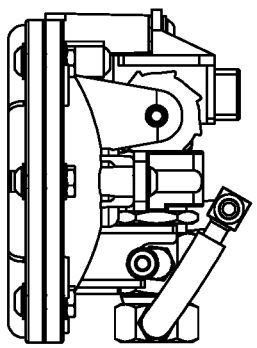
FIG. 7 depicts a front view of one embodiment of the invention.

FIG. 7 depicts a front view of a mechanically actuated, selectable on/off sequencing valve.

Figures 8, 9:
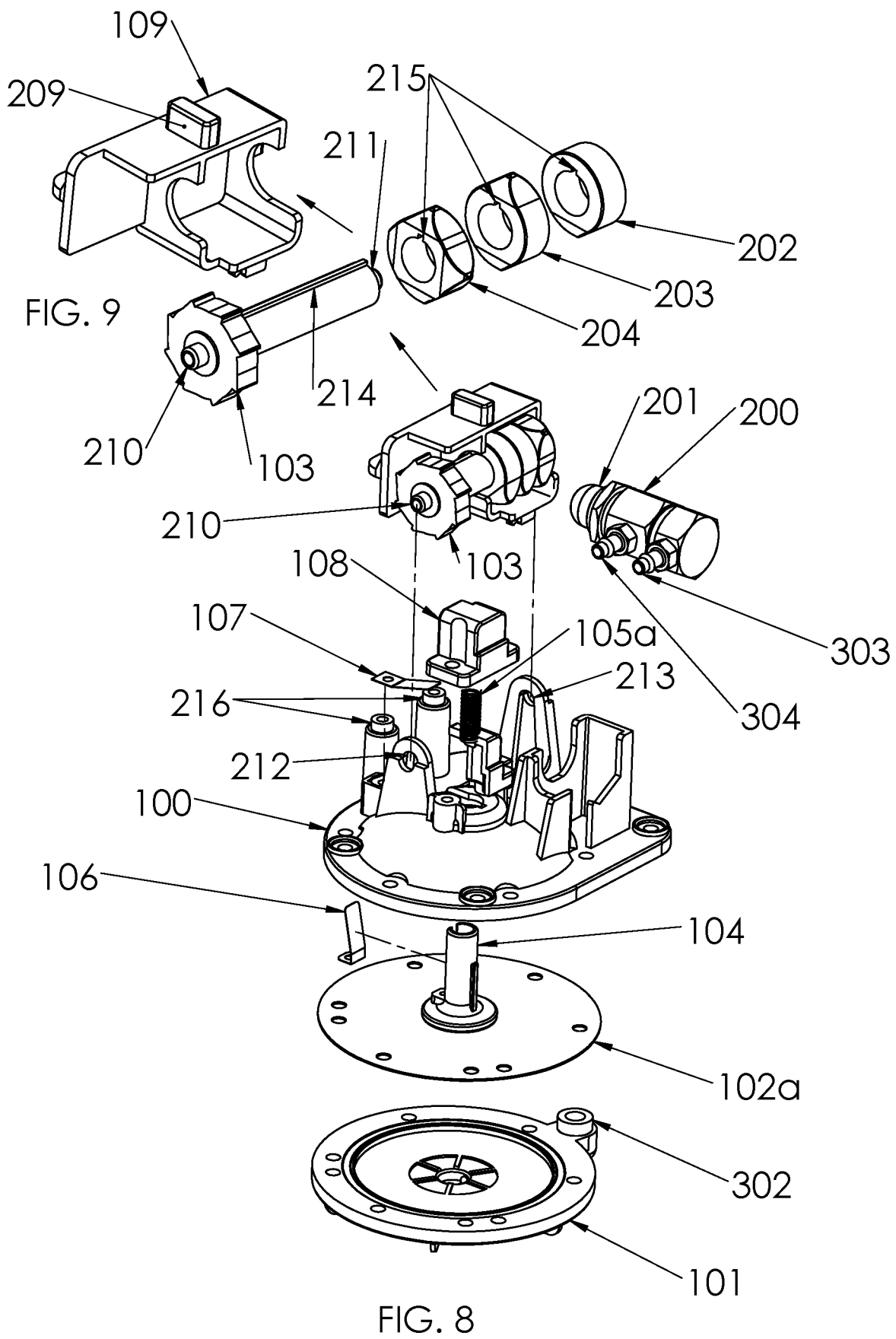
FIG. 8 depicts a right front top exploded view of all of a preferred embodiment.
FIG. 9 depicts an exploded view of a gear spindle, yoke and cams of a preferred embodiment of sub-assembly components.

FIG. 8 depicts an exploded view of all the components of a preferred embodiment. A diaphragm housing 100 and diaphragm housing cap 101 are shown. A diaphragm 102a (the diaphragm in a neutral flat configuration) with diaphragm guide rod 104 centrally attached to the diaphragm 102a and ratchet flexure finger 106 attached to the diaphragm guide rod 104 are captured and secured between the diaphragm housing 100 and diaphragm housing cap 101. Main pressure or fluid pressure may be applied to diaphragm housing cap inlet 302 which may comprise a void defined within the diaphragm housing cap 101 This pressure flexes the diaphragm 102a and moves or urges the diaphragm guide rod and ratchet flexure finger upwards in this view. A compression spring 105 or other elastic member may be housed and guided between the diaphragm guide rod and spring mount 108. The compression spring provides a force to return the diaphragm to its neutral, unflexed planar state after the main pressure is released. An alternative embodiment of diaphragm 102a, shown as a flexible flat rubber sheet, is a contoured rolling diaphragm. This may reduce the pressure force necessary to move the diaphragm guide rod 104 upwards and increase the working life of the diaphragm.

FIG. 8 further depicts a commercially available, 2-way normally closed valve 200, a valve plunger 201, valve inlet 303 and valve outlet 304. An alternative embodiment of a discrete, two-way normally closed valve 200, would be to incorporate valve features and custom valve components into the diaphragm housing 100.

FIG. 9 depicts an exploded view of a gear spindle 103, single lobe cam a 202, 2 lobe cam b 203, 4 lobe cam c 204 and slider yoke 109. A gear spindle 103 is supported at a gear spindle front pivot 210 and rotates in gear spindle front pivot mount 212. The gear spindle is also supported at a gear spindle rear pivot 211 and rotates in gear spindle rear pivot mount 213.

Referring to FIG. 9, cam a, cam b and cam c are mounted slidably onto the gear spindle. Lobed Cam a, cam b and cam c are rotationally mated with the gear spindle via the gear spindle key rib 214 and cam key grooves 215. Cam a, cam b and cam c are slid together on the gear spindle and are inserted into and axially nested as a group into slider yoke 209 as shown in FIG. 8.

Figure 10:
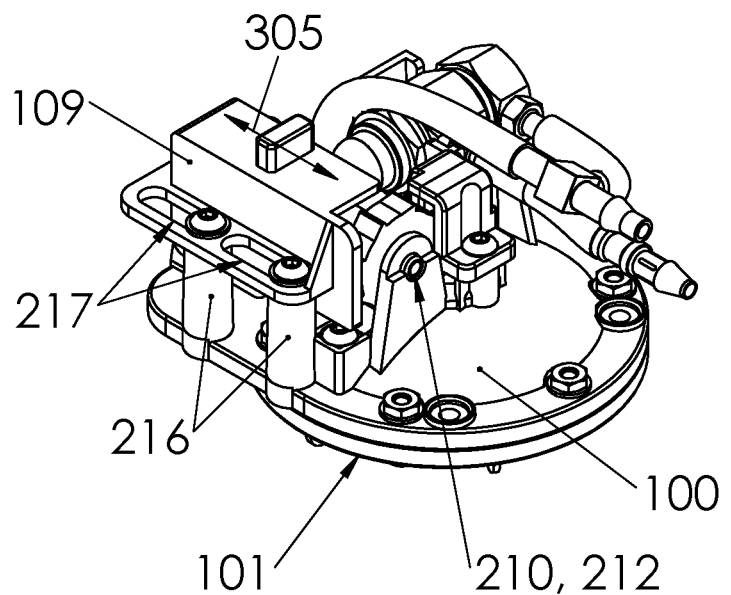
FIG. 10 depicts a top left front perspective view of one embodiment of the invention.

FIG. 10 depicts a top perspective view showing diaphragm housing 100, diaphragm housing cap 101, slider yoke 109, guide posts 216, and slider yoke guide slots 217. The slider yoke has cams 202, 203 and 204 nested and is laterally slidable and guided via slider yoke slots 217 and guide posts 216. Bilateral movement arrows 305 depict this movement. Also shown is gear spindle front pivot 210 and diaphragm housing front pivot mount 212.

Figure 11:
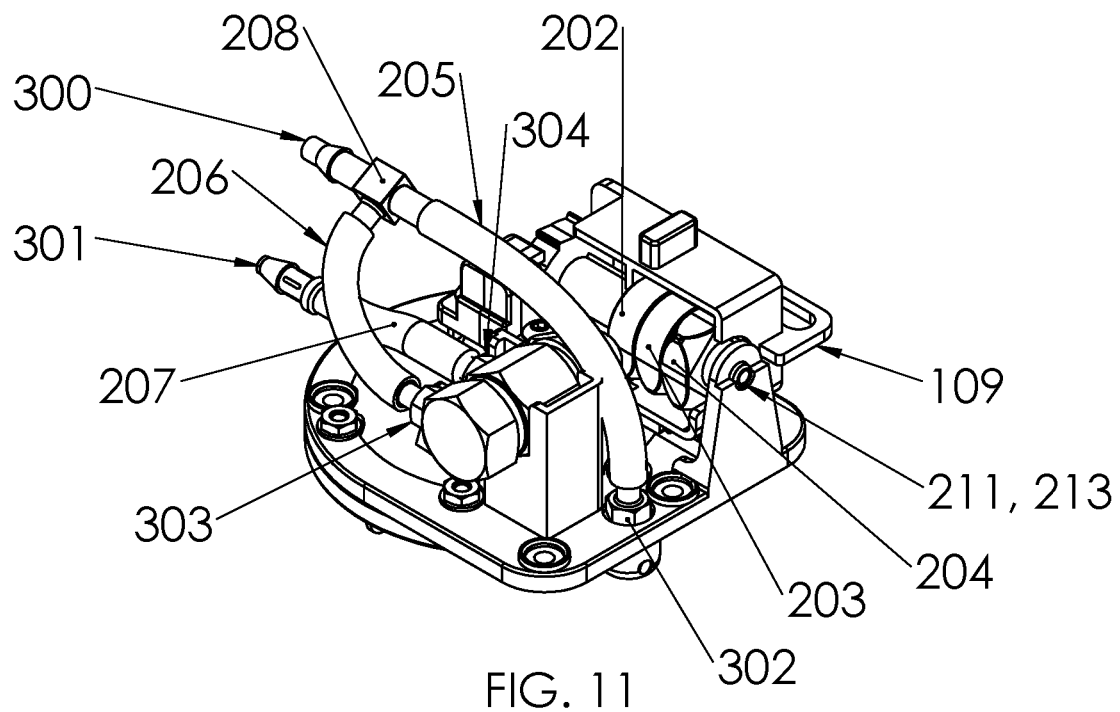
FIG. 11 depicts a top right rear perspective view of one embodiment of the invention.

FIG. 11 depicts perspective view showing fluid input feed 300, fluid output 301, valve inlet 303, valve outlet 304, diaphragm housing cap inlet 302, diaphragm housing cap inlet tube 205, valve inlet tube 206, tee fitting 208, outlet tube 207, slider yoke 109, cam a 202, cam b 203 and cam c 204. Also shown is gear spindle front pivot 211 and diaphragm housing front pivot mount 213. The Fluid input feed fluid provides fluid pressure and flow to the diaphragm housing cap inlet 302 and the valve inlet via Tee fitting 208. Alternative embodiments of inlet tube 205, valve inlet tube 206, tee fitting 208 and outlet tube 207 would be to incorporate flow channel features into the diaphragm housing 100.

Figure 12:
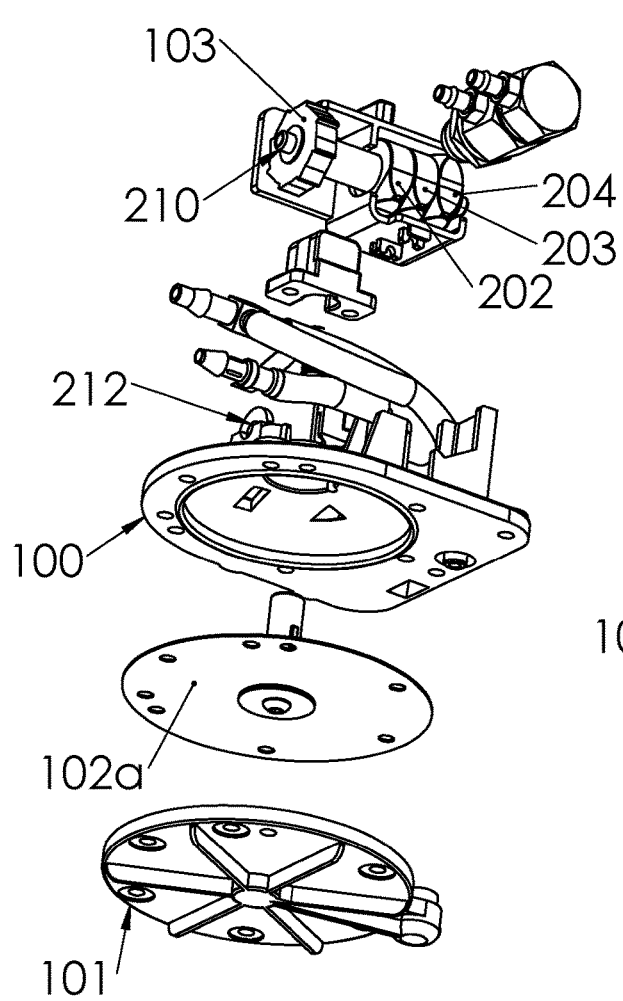
FIG. 12 depicts a bottom right front exploded view of all of a preferred embodiment.

FIG. 12 depicts a lower right exploded view of the components of a preferred embodiment.

Figure 13:
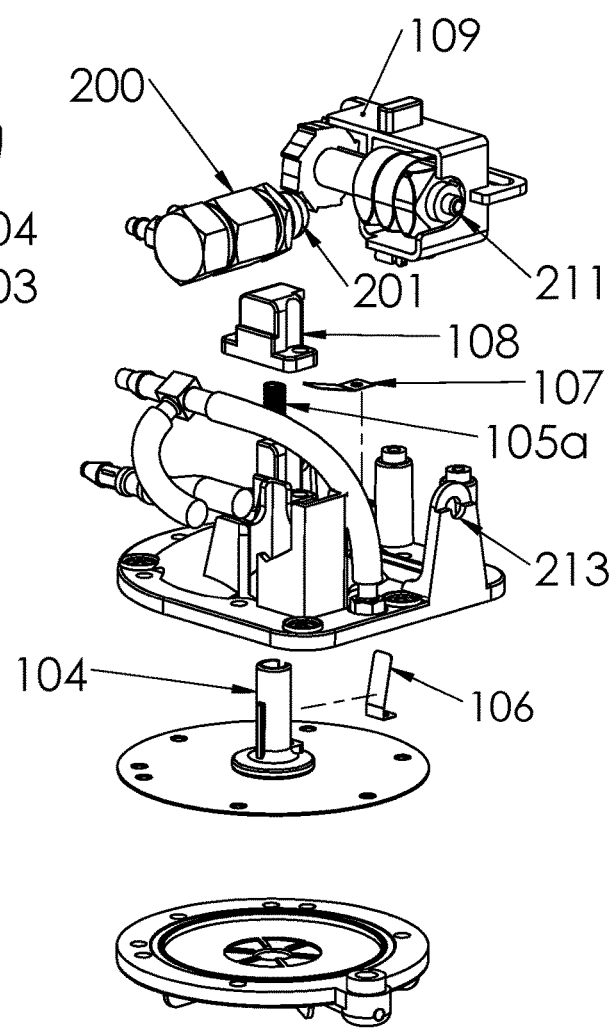
FIG. 13 depicts a top left rear exploded view of all of a preferred embodiment.

FIG. 13 depicts an upper rear exploded view of the components of a preferred embodiment.

Figure 15:
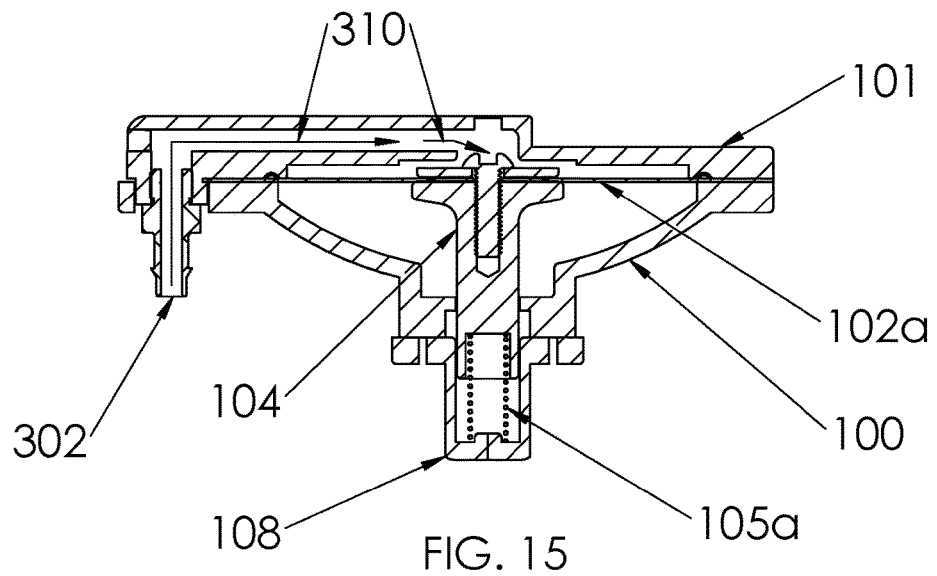
FIG. 15 depicts a cross sectional view from FIG. 14
Figure 14:
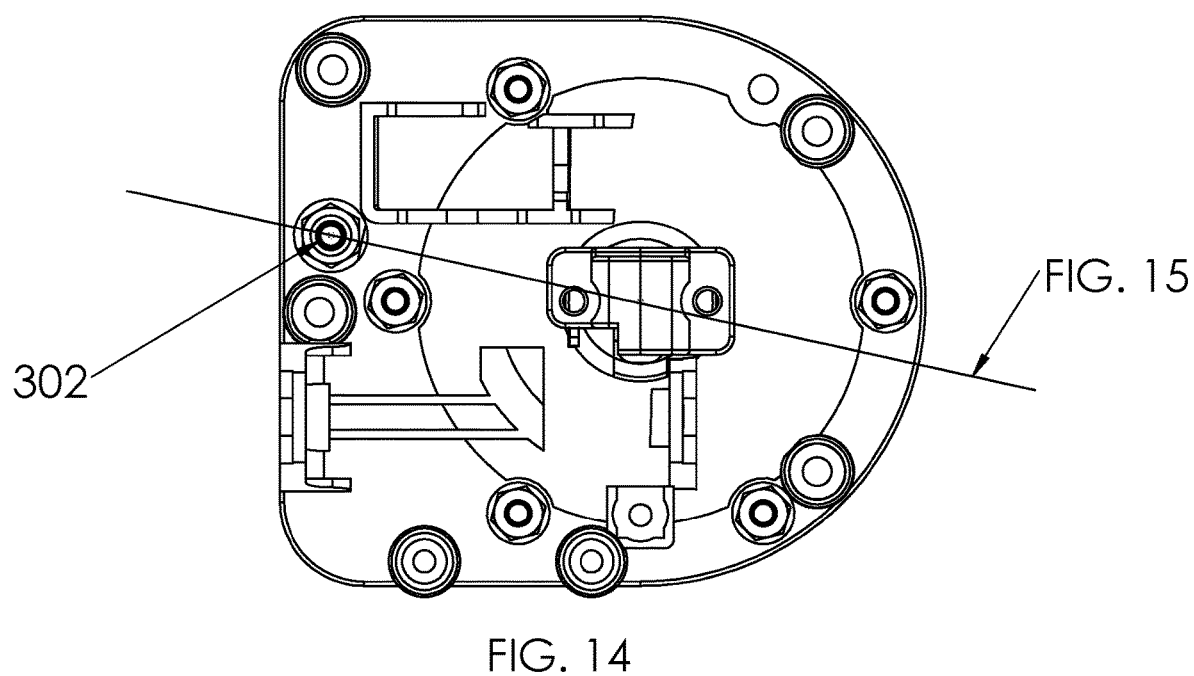
FIG. 14 depicts a top elevation view of one embodiment of the invention.

FIG. 14 depicts a bottom view with a cross section line for the view depicted in FIG. 15

FIG. 15 depicts cross sectional view showing diaphragm housing cap 101 and diaphragm housing cap inlet 302 with directional arrow of fluid flow 310 into a diaphragm housing cap. Further depicted is diaphragm in a neutral flat configuration 102a, diaphragm housing 100, diaphragm guide rod 104, spring mount 108 and a compression spring in an uncompressed configuration 105a FIG. 16 depicts a side view of a cam a 202 with 1 lobe, 1 lobe nose 315, one base circle surface 316 and a cam key groove 215.

FIG. 17 depicts a side view of a cam b 203 with 2 lobes, 2 lobe noses 315, 2 base circle surfaces 316 and a cam key groove 215.

FIG. 18 depicts a side view of a cam c 204 with 4 lobes, 4 lobe noses 315, 4 base circle surfaces 316 and a cam key groove 215.

The cams in FIGS. 16, 17 and 18 in this preferred embodiment are based on an 8-sector circle and match the 8 teeth present on gear spindle 103. Each pulse of the fluid input feed 300 indexes the gear spindle one tooth and the cams, one sector. Since cam a 202 has one lobe, 7 steps are skipped before opening the 2-way normally closed valve 200 in a full 360-degree cycle. Since cam b 203 has 2 apposing lobes, every 3rd step opens the 2-way normally closed valve 200 in a full 360-degree cycle. Since cam c 203 has 4 lobes, every other step opens the 2-way normally closed valve 200 in a full 360-degree cycle. Alternative embodiments could include only 1 cam, 4 cams, 5 cams and so on. Furthermore, each cam or set of cams may be based on other even numbers of sectors such as 12, 14 or 16.

FIG. 19 depicts a partial cross sectional view of diaphragm housing, diaphragm housing cap, diaphragm guide, gear spindle, compression spring, spring mount, ratchet flexure finger and ratchet flexure pawl. A pressure pulse from fluid input feed 300 is present, is pressurizing diaphragm 102b and has moved diaphragm guide rod 104 and ratchet flexure finger 106 upwards, thus rotating gear spindle 103 one tooth counter-clockwise depicted by rotation direction arrow 306. Center of the common axis of rotation of gear spindle 103 and lobed cams 202, 203, 204, 311 is shown. Compression spring in a compressed configuration 105a is also shown.

FIG. 20 depicts a side view of a 2-way normally closed valve 200, valve plunger 201 and 2 lobed cam b 203 in the same rotational sequence orientation as shown in FIG. 19. Rotation arrow 306 is shown. Cam b is rotationally positioned with lobe nose 315 in contact with valve plunger 201, translating valve plunger 210 to the right and opening 2-way normally closed valve 200. Since fluid input feed 300 is also providing fluid pressure to 2-way normally closed valve 200 at valve inlet 303, main outlet fluid 301 flows through valve outlet 304.

FIG. 21 depicts a graphic symbol of a normally closed 2-way valve 200 in the open position.

Figure 22:
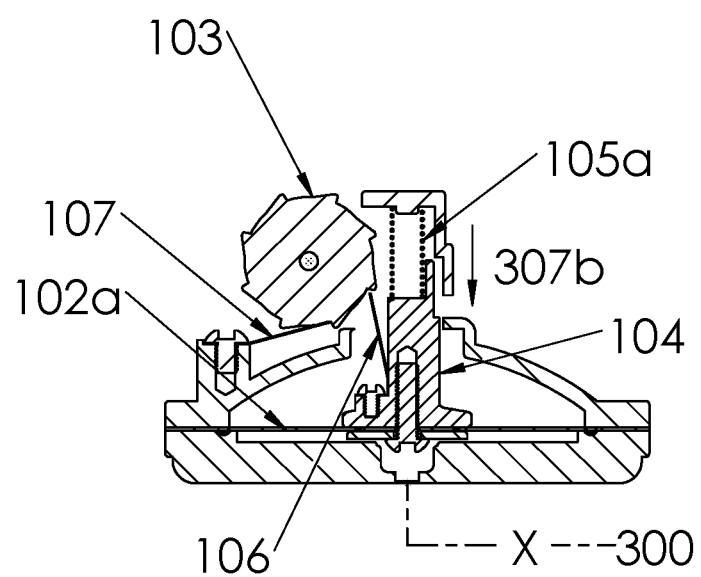
FIG. 22 depicts a partial cross sectional view of diaphragm housing, diaphragm housing cap, diaphragm guide, gear spindle, compression spring, spring mount, ratchet flexure finger and ratchet flexure pawl.

FIG. 22 depicts a partial cross sectional view of diaphragm housing, diaphragm housing cap, diaphragm guide, gear spindle, compression spring, spring mount, ratchet flexure finger and ratchet flexure pawl. The pressure from fluid input feed 300 depicted in FIG. 20 is released and vented. Compression spring in an uncompressed configuration 105a is shown and has applied a force to push diaphragm guide rod 104 and ratchet flexure finger 106 downward. The diaphragm in a neutral flat configuration 102a is shown. As diaphragm guide rod 104 and ratchet flexure finger 106 move downward due to the compression spring force, ratchet flexure pawl 107 rotationally locks gear spindle 103 and keeps it from rotating clock-wise. Cams 202, 203, 204, not shown, are also rotationally locked and do not rotate.

FIG. 23 depicts a partial cross sectional view of diaphragm housing, diaphragm housing cap, diaphragm guide, gear spindle, compression spring, spring mount, ratchet flexure finger and ratchet flexure pawl. A new pressure pulse from fluid input feed 300 is present, is pressurizing diaphragm 102b and has moved diaphragm guide rod 104 and ratchet flexure finger 106 upwards, thus rotating gear spindle 103 one tooth counter-clockwise depicted by rotation direction arrow 306. Compression spring in a compressed configuration 105a is also shown.

FIG. 24 depicts a side view of a 2-way normally closed valve 200, valve plunger 201 and 2 lobed cam b 203 in the same rotational sequence orientation as shown in FIG. 23. Rotation arrow 306 is shown. Cam b 203 is rotationally positioned with the base circle 316 in contact with valve plunger 201, translating valve plunger 210 to the left 308 and closing 2-way normally closed valve 200. Since 2-way normally closed valve 200 is closed in this configuration, main outlet fluid 301 flow is blocked.

FIG. 25 depicts a graphic symbol of a normally closed 2-way valve 200 in the closed position.

Figure 26:
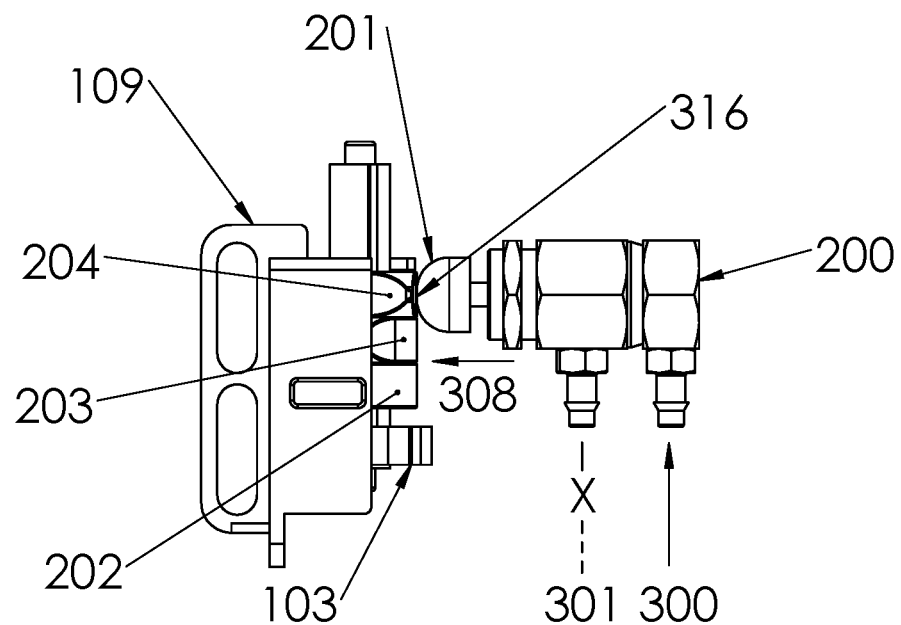
FIG. 26 depicts a top view of a valve and valve plunger with a valve plunger resting on the base circle of a cam and the valve in the closed condition, a slider yoke, gear spindle and 3 cams.

FIG. 26 depicts a top view of a preferred embodiment showing a single lobe cam a 202, 2 lobe cam b 203, 4 lobe cam c 204, slider yoke 109, 2-way normally closed valve 200, valve plunger 201 and a gear spindle 103. In this configuration, cam c 204 is lined up with valve plunger 201 which is resting on base circle 316. Movement direction arrow of valve plunger 308 is shown. 2-way normally closed valve 200 is closed and fluid output 301 is blocked.

Figure 27:
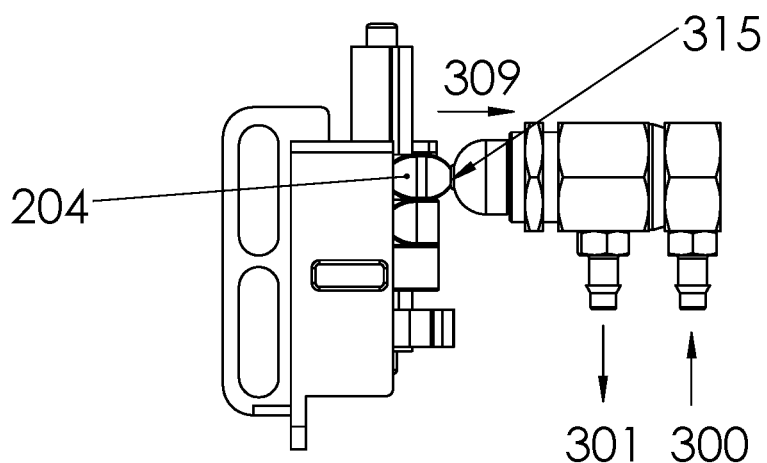
FIG. 27 depicts a top view of a valve and valve plunger with a valve plunger resting on the nose of a cam lobe and the valve in the open condition, a slider yoke, gear spindle and 3 cams.

FIG. 27 depicts a top view of a preferred embodiment showing a single lobe cam a 202, 2 lobe cam b 203, 4 lobe cam c 204, slider yoke 109, 2-way normally closed valve 200, valve plunger 201 and a gear spindle 103. In this configuration, cam c 204 is lined up with valve plunger 201 which is resting on lobe nose 315. Movement direction arrow of valve plunger 309 is shown. 2-way normally closed valve 200 is open and fluid output 301 is flowing.

Figure 28:
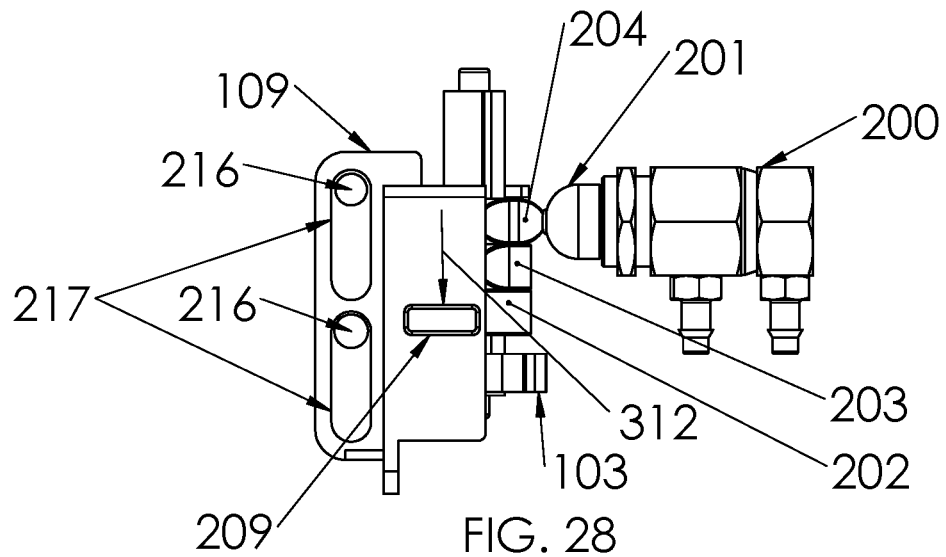
FIG. 28 depicts a top view of a slider yoke positioned in a bottom position, a valve and valve plunger with a plunger resting on the nose of top cam lobe and the valve in the open condition, and a gear spindle.

FIG. 28 depicts a top view of a preferred embodiment showing a single lobe cam a 202, 2 lobe cam b 203, 4 lobe cam c 204, slider yoke 109, slider yoke guide slots 217, guide posts 216, a 2-way normally closed valve 200, valve plunger 201 and a gear spindle 103. The Slider Yoke 109 cradles cam a 202, cam b 203 and cam c 204 together. The Slider Yoke is guided by slots 217 and guide posts 216. The slider Yoke can be positioned in three different positions to present cam a, cam b or cam c to align with the with valve plunger 201. In this FIG., the Slider Yoke is in the lower position and cam c 204 is aligned with the valve plunger 201. Movement direction arrow 312 is shown. In the preferred embodiment, the slider yoke finger push tab is used to move the Slider Yoke and cams to each of the 3 positions.

Figure 29:
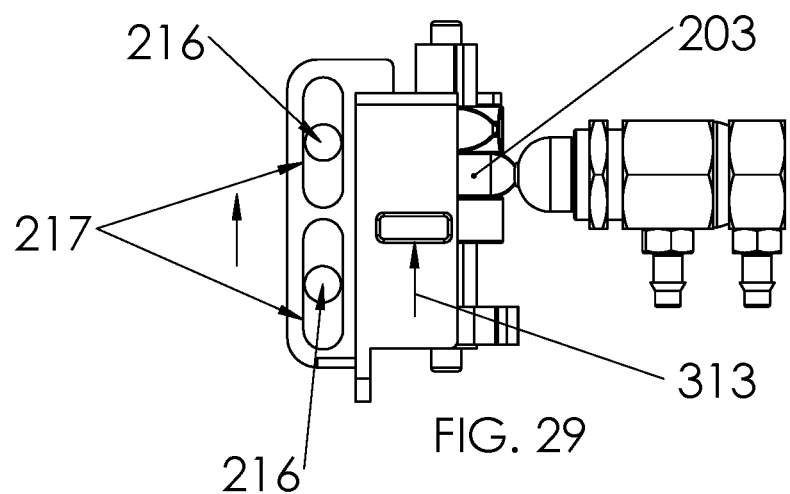
FIG. 29 depicts a top view of a slider yoke positioned in a middle position, a valve and valve plunger with a plunger resting on the nose of a middle cam lobe and the valve in the open condition, and a gear spindle.

FIG. 29 depicts a top view of a preferred embodiment from FIG. 28 showing the Slider Yoke in the middle position and cam b 203 is aligned with the valve plunger 201. Movement direction arrow 313 is shown.

Figure 30:
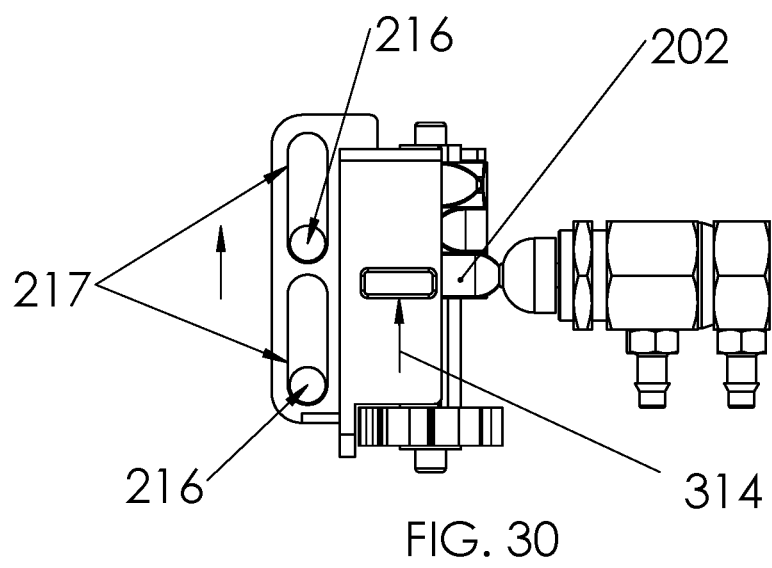
FIG. 30 depicts a top view of a slider yoke positioned in a top position, a valve and valve plunger with a plunger resting on the nose of a bottom cam lobe and the valve in the open condition, and a gear spindle.

FIG. 30 depicts a top view of a preferred embodiment from FIG. 28 showing the Slider Yoke in the upper position and cam b 202 is aligned with the valve plunger 201. Movement direction arrow 314 is shown.

In an alternative embodiment, the slider Yoke depicted in FIGS. 28-30 may also be incrementally moved into position via external electronic, pneumatic or hydraulic means such as a motor or cylinder and may be controlled remotely via wiring to a switch control module or via WiFi networking.

In general, a disclosed embodiment may be comprised of a main fluid intake 300 fluid input feed FIGS. 1 to 302 diaphragm housing cap inlet FIG. 11, directing fluid within a fluid channel of the diaphragm housing cap 101 FIG. 15 in a central direction 310 through a center void of the diaphragm housing cap that pressurizes and motivates and/or influences and/or moves a diaphragm 102a FIG. 15 and guide rod 104 axially. The guide rod 104 FIG. 19 houses a ratchet flexure finger 106 FIG. 19 which tangentially engages and rotates (directional arrow 306 of FIG. 19) a gear spindle 103 FIG. 19 which is rotationally coupled to and houses one or multiple cams 202, 203, and 204 FIG. 12. A two-way valve 200 FIG. 13 is in contact with one of the cams tangentially and centrically via a valve plunger 201 FIG. 13. The cam or cams have one or more lobes (FIG. 16 and FIG. 17 show lobes of cam 202 and cam 203) with the peak 315 FIG. 16 of the profile being the nose 315 FIG. 16 and one or more lower profile base circles 316 of FIG. 16. As the cam is rotated, it engages with the valve plunger at the nose or base circle, thusly translating the plunger axially and opening or closing the valve flow. Multiple cams with different numbers of lobes, four (see FIG. 18), two and one for example, may be slidably mounted on a gear spindle 214 FIG. 9 and nested in a sliding yoke 109 FIG. 9. The sliding yoke 109 FIG. 9 may be manually moved by use of a slider yoke finger push tab (209) to position each of the different cams at the centerline of the valve plunger to increment various open close cycles of the valve. Thus, the valve 200 FIG. 8 may be controlled by selecting one cam from a plurality of cams mounted upon a gear spindle.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A system for irrigation timing the system comprising: a) a diaphragm housing (100) comprising: i) a diaphragm (102a) in axial movement with the diaphragm housing the diaphragm having an upper side attached to a diaphragm guide rod (104) with a ratchet flexure finger (106) attached to the diaphragm guide rod; ii) a diaphragm housing cap (101) securing the diaphragm to the diaphragm housing; the diaphragm housing cap defining a diaphragm housing inlet (302), the diaphragm housing inlet in fluid connection with a channel defined within the diaphragm housing cap allowing fluid to flow in the direction (310) of a center void defined within the diaphragm housing cap, the center void in fluid connection with a bottom side of the diaphragm, such that when pressure is exerted to the bottom side of the diaphragm the diaphragm guide rod with the attached ratchet flexure finger move upwardly to a bottom side of the diaphragm housing; iii) as the ratchet flexure finger is moved upwardly, the ratchet flexure finger engages and rotates a gear spindle (103, FIG. 19), the gear spindle attached to a gear spindle cylinder (214) with one or more cams attached to the gear spindle cylinder; iv) each of the one or more cams comprises a peak surface (315) and a base circle surface (316) in rotational contact with a plunger (201), the plunger connected to an on and off valve (200) with the plunger controlling the fluid connection between a valve inlet (303) and valve outlet (304) of the on and off valve.

2. The system of claim 1, further including the gear spindle cylinder having a key rib, the key rib comporting and mating to a cam key groove (215) defined by the one or more cams.

3. The system of claim 1, further including a fluid input feed (300) in fluid connection with a tee fitting (208), the tee fitting in fluid connection with a diaphragm housing inlet tube (205) in fluid connection with the diaphragm housing cap inlet (302); the tee fitting in fluid connection with a valve inlet tube (206), the valve inlet tube in fluid connection with the valve outlet of the valve.

4. The system of claim 1, further including a fluid output (301) in fluid connection with an outlet tube (207) the outlet tube in fluid connection with the valve outlet of the valve.

5. The system of claim 1, further including a compression spring (105) contained within an interior void of the diaphragm guide rod (104), and an interior void defined by a spring mount (108).

6. The system of claim 1, further including a front pivot mount (212) and a rear pivot mount (213) disposed upon the top surface of the diaphragm housing; the gear spindle comprising a front pivot in rotational attachment to the front pivot mount and the gear spindle attached to a rear pivot (211) in rotational attachment to the rear pivot mount.

7. The system of claim 6, further including a slider yoke (109) which is slidably mounted to and guided by guide posts (216) and cradles the one or more cams.

8. The system of claim 7, wherein the slider yoke slides to align the one or more cams with a valve plunger.

* * * * *